(12) United States Patent  
Liang et al.

(10) Patent No.: US 9,419,820 B1
(45) Date of Patent: Aug. 16, 2016

(54) GENERATING SOCIAL NETWORKS FROM SOCIAL CONNECTION DATA

(71) Applicants: Yu Liang, Mountain View, CA (US); Xiaotao Duan, Santa Clara, CA (US)

(72) Inventors: Yu Liang, Mountain View, CA (US); Xiaotao Duan, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 709 days.

(21) Appl. No.: 13/648,152

(22) Filed: Oct. 9, 2012

(51) Int. Cl.
*H04L 12/58* (2006.01)
*H04L 29/08* (2006.01)

(52) U.S. Cl.
CPC .............. *H04L 12/581* (2013.01); *H04L 51/32* (2013.01)

(58) Field of Classification Search
CPC .............. H04L 12/581–12/5895; H04L 51/32; H04L 65/00–65/4007; H04L 67/14–67/22
See application file for complete search history.

(56) References Cited

U.S. PATENT DOCUMENTS

| | | | |
|---|---|---|---|
| 7,583,671 B2 * | 9/2009 | Ramani et al. | 370/392 |
| 7,987,110 B2 | 7/2011 | Cases et al. | |
| 8,788,657 B2 * | 7/2014 | Hodges et al. | 709/224 |
| 2011/0179125 A1 | 7/2011 | Lee et al. | |
| 2011/0179161 A1 | 7/2011 | Guy et al. | |
| 2012/0089678 A1 | 4/2012 | Cort et al. | |
| 2012/0198015 A1 | 8/2012 | Gorti et al. | |
| 2013/0051542 A1 * | 2/2013 | Yao et al. | 379/142.09 |
| 2013/0132484 A1 * | 5/2013 | Berezecki | 709/205 |
| 2013/0143520 A1 * | 6/2013 | Cai et al. | 455/405 |

* cited by examiner

*Primary Examiner* — Nicholas Taylor
*Assistant Examiner* — Clayton R Williams
(74) *Attorney, Agent, or Firm* — IP Spring

(57) ABSTRACT

Embodiments generally relate to generating social networks from device specific communications. In one embodiment, a method includes determining social connection data included in communications, the communications being associated together via a device identifier and generating a communications-based social network for an end user from the determined social connection data, the end user being associated with the device identifier.

18 Claims, 8 Drawing Sheets

GENERATING SOCIAL NETWORKS FROM SOCIAL CONNECTION DATA

TECHNICAL FIELD

Embodiments relate generally to social networking, and more particularly to generating social networks from social connection data.

BACKGROUND

End users of social networks may create various types of networks that include social networking participants linked together by their relationships. Linkages between participants within a social network are deliberately established by selection and invitation (e.g., user-defined). Often, linkages in an end user's social network only comprise a portion of the actual linkages or relationships for the end user. That is, the end user may have social connections with various individuals who are not within their social networks. If this individual is not a participant in a subject's social network system or the individual has not been invited to the social networks of the end user, this relationship remains outside these user-defined social networks.

SUMMARY

Embodiments generally relate to generating a social network from social connection data associated with a computing device. In one embodiment, a method includes determining social connection data included in communications. The social connection data may include identifiers for each communicating party and a device identifier associated with an end user. It will be understood that the end user is one of the communicating parties. In some embodiments, the method includes grouping communications together based upon the device identifier. In some embodiments, the method includes generating at least one communications-based social network for the end user from the determined social connection data, as well as generating an aggregated social network by linking nodes which are shared between two or more communications-based social networks. In some embodiments, each node includes social connection data for a communication.

In another embodiment, a method includes determining social connection data included in communications. The communications are associated together via a device identifier. Additionally, the method includes generating a communications-based social network for an end user from the determined social connection data. Again, the end user is associated with the device identifier.

With further regard to the method, in one embodiment, the method may further include evaluating the communications to determine connection types between communicating parties. In one embodiment, the method includes determining a connection strength between two or more communicating parties. In one embodiment, the method includes determining a connection strength between two or more communicating parties, where the connection strength is based upon communication frequency between the two or more communicating parties. In one embodiment, the method includes determining a connection strength between two or more communicating parties. In one embodiment, the connection strength is based upon evaluating metadata and content included in the communications.

In one embodiment, the method includes determining a communication type for each communication and grouping communications for an end user based upon communication type. In one embodiment, the method includes determining a communication type for each communication and grouping communications for an end user based upon communication type. Additionally, in one embodiment, the method includes generating a communication-type sub-graph for each communication type. In one embodiment, the method includes merging two or more communication-type sub-graphs together to create a communications-based connections graph. In one embodiment, the method includes generating an aggregated social network by linking communications-based connection graphs for two or more end users together based upon sharing of one or more nodes between two or more communications-based connections graphs to generate an aggregated social network. In one embodiment, each node includes social connection data for a communication. In one embodiment, the method includes social connection data that includes one or more of identifiers for each communicating party and content of the communications. In one embodiment, the device identifier includes one or more of an international mobile equipment identity, an Internet protocol address, a media access control address, a personal identification number, a serial number, an international mobile subscriber identity, a mobile equipment identifier, and an integrated circuit card ID. In one embodiment, the communications include any of telephonic communications, email communications, short message service messages, and any combinations thereof.

In some embodiments, a system includes one or more processors and logic encoded in one or more tangible media for execution by the one or more processors and when executed operable to perform operations including determining social connection data included in communications, where the communications being associated together via a device identifier and generating a communications-based social network for an end user from the determined social connection data. In one embodiment, the end user is associated with the device identifier.

In one embodiment, the logic when executed is further operable to perform operations including determining a connection strength between two or more communicating parties. In one embodiment, the connection strength is based upon evaluating metadata and content included in the communications. In one embodiment, the logic when executed is further operable to perform operations including determining a communication type for each communication, grouping communications for an end user based upon communication type, and generating a communication-type sub-graph for each communication type.

In one embodiment, the logic when executed is further operable to perform operations including merging two or more communication-type sub-graphs together to create a communications-based connections graph. In one embodiment, the logic when executed is further operable to perform operations including generating an aggregated social network by linking communications-based connection graphs for two or more end users together based upon sharing of one or more nodes between two or more communications-based connections graphs to generate an aggregated social network. In one embodiment, each node includes social connection data for a communication. In one embodiment, the social connection data includes one or more of identifiers for each communicating party and content of the communications.

In one embodiment, the device identifier includes one or more of an international mobile equipment identity, an Internet protocol address, a media access control address, a personal identification number, a serial number, an international mobile subscriber identity, a mobile equipment identifier, and an integrated circuit card ID.

DETAILED DESCRIPTION

Embodiments described herein provide communications-based social networks from social connection data obtained from communications. Advantageously, communications facilitated by computing devices, such as cellular telephones, laptops, tablets, and other similar computing systems may provide many different types of communications that include social connection data. In some instances, the end user may frequently communicate with other communicating parties via telephonic interactions, email communications, text messages, or other similar types of communications. Moreover, the various types of communications may provide many types of social connection data that reflect actual (e.g. face-to-face, real-time, etc.) relationships and connections between communicating parties.

Communicating parties frequently utilize mobile communications devices to engage in most, if not all, of these various types of communications. Therefore, a mobile communications device may function as a locus of communications that provide a wealth of social connection data.

In some embodiments, a system determines social connection data included in communications. In one embodiment, the social connection data includes identifiers for each communicating party and a device identifier associated with an end user. For example, identifiers may include email addresses, telephone numbers, account numbers, usernames, and so forth. The device identifier may include, for example, an IMEI, a MAC address, or other similar identifier that may be used to uniquely identify a communications device on a network. It will be understood that the end user is one of the communicating parties. In one embodiment, the system groups communications together based upon the device identifier and generates at least one communications-based social network for the end user from the determined social connection data. In one embodiment, the system generates an aggregated social network by linking nodes which are shared between two or more communications-based social networks. In accordance with the present disclosure, each node includes social connection data for a communication. For example, social connection data for a communication between two communicating parties may include an identifier, such an email address, for each of the two communicating parties. The social connection data may also include a device identifier for the communications device associated with the sender of the email communication. The identifiers for the two communicating parties may be included in separate nodes. The device identifier may also be associated with one of the nodes. For example, the device identifier may be associated with the node which includes the sender's email address.

Figure 1:
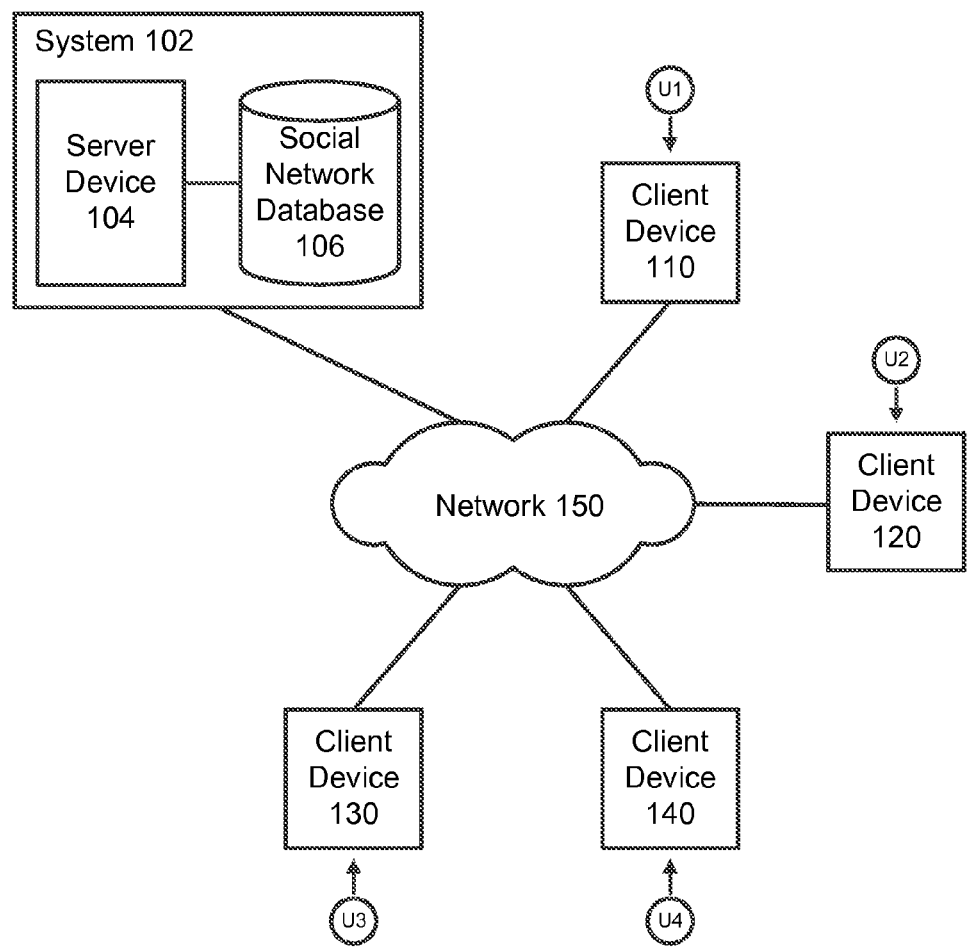
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150. Each client device 110, 120, 130, and 140 may be any type of electronic device such as a mobile phone, a tablet, a computer, etc.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein. In various embodiments, users U1, U2, U3, and U4 may communicate with each other and may interact with system 102 using respective client devices 110, 120, 130, and 140.

Figure 2:
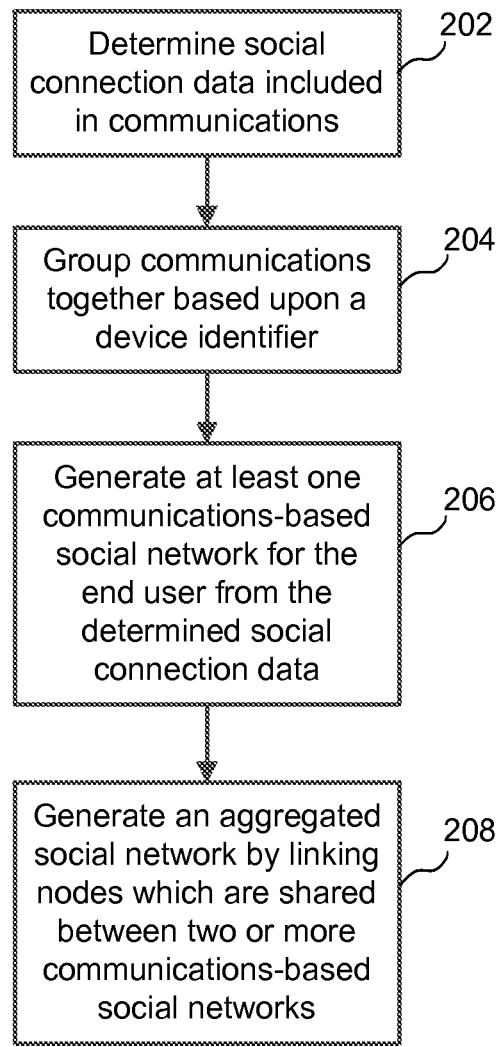
FIG. 2 illustrates an example simplified flow diagram for generating a communications-based social network from social connection data obtained from communications, according to one embodiment.

FIG. 2 illustrates an example simplified flow diagram for generating a communications-based social network from social connection data described in greater detail below, according to some embodiments. Referring to both FIGS. 1 and 2, a method is initiated in block 202, where system 102 determines social connection data included in communications. The communications may include any type of communication conducted using a computing device. Example communication types include, but are not limited to, telephonic communications, electronic mail communications, short message service (SMS) communications, wireless communications (e.g., Bluetooth, radio frequency identification "RFID", WiFi, near field communication "NFC", etc.), as well as other communications that would be known to one of ordinary skill in the art with the present disclosure before them.

Stated otherwise, system 102 may consider the end user of the communications device as being synonymous with the device identifier. In some instances, the end user may be bound to the communications device via a services account. For example, an end user may be associated with a cellular telephone by tying the IMEI of the cellular telephone to an account number for the end user. This information is typically stored in the subscriber identity module (SIM) card, which is installed in the cellular telephone.

In one embodiment, the social connection data includes identifiers for each communicating party and a device identifier associated with an end user. A device identifier may include any identifier that uniquely identifies a computing device, such as an international mobile equipment identity (IMEI), an Internet protocol (IP) address, a media access control (MAC) address, a personal identification number (PIM), a serial number, an international mobile subscriber identity (IMSI), a mobile equipment identifier, a subscriber identity module number (SIM), and an integrated circuit card ID—just to name a few. Because the end user may be directly associated with the communications device associated with the device identifier, the end user may be directly or indirectly linked to the communications device by the device identifier, as will be described in greater detail below.

In block 204, system 102 groups communications together based upon the device identifier. As will be described in greater detail below, communications may be grouped based upon the device identifier may include creating various subgraphs, merged graphs, and social networks from social connection data obtained from the communications. Thus, the term "grouping" may be understood to include associating, linking, connecting, graphing, and so forth.

In block 206, system 102 generates at least one communications-based social network for the end user from the determined social connection data. Advantageously, the communications-based social network may be generated for the end user using the aforementioned association between the end user and the communications device. That is, the communications evaluated for social connection data are linked to a specific communications device via the device identifier included in the communications. Because the end user is linked to the communications device, the end user may ultimately be associated with the social network generated by system 102.

In block 208, system 102 generates an aggregated social network by linking nodes which are shared between two or more communications-based social networks. Stated otherwise, system 102 may link a communications-based social network for a first user with a communications-based social network associated with a second user based upon the presence of one or more shared nodes (e.g., one or more nodes shared between the communications-based social network for the first user and the communications-based social network associated with the second user). Each node of a communications-based social network may include social connection data for a communication. That is, for each communication, the social connection data obtained therefrom may be used to create a node. These nodes may be arranged into one or more graphs, as will be described in greater detail below.

Communications may be obtained from a communications device, such as any of client devices 110, 120, 130, and 140. For purposes of brevity and clarity of description, the following embodiments will reference an example communications device, such as a cellular telephone. Again, communications contemplated for use in accordance with the present disclosure include, but are not limited to, email communications, telephonic communications, short message service messages, and so forth. In some embodiments, system 102 may obtain communications from individual programs executing on the cellular telephone. That is, various programs that are executable on the cellular telephone may be configured to obtain certain types of data from communications generated by the program itself. For example, an email client running on the cellular telephone may evaluate each email communication processed on the cellular telephone and determine social connection data included in each email.

In some instances, an email communication may comprise a sender email address, a recipient email address, and an identifier for the cellular telephone. Many other types of available or determinable data may also be determined by the email client. The email client may maintain a record of social connection data for email communications processed by the email client. This record may be stored on the cellular telephone in memory. In other instances, the email client may transmit the social connection data back to system 102, using any of the available network connections of the cellular telephone, such as a cellular network connection, a WiFi network connection, or any other network connections available to the cellular telephone.

Therefore, in some embodiments, each program (e.g., application) that facilitates communications on the cellular telephone may determine social connection data from communications, and provide the social connection data to system 102.

In additional embodiments, an operating system on the cellular telephone may be configured to detect the processing or execution of a communication on the cellular telephone. Thus, the operating system may detect a communication and evaluate the communication for the social connection data. In one embodiment, the cellular telephone may include a program, module, layer, or other mechanism that detects and parses social connection data determined from communications of the cellular telephone.

In one embodiment, rather than processing communications at the device level (e.g., at the cellular telephone), system 102 may receive copies of the communications from the various programs of communication devices and determine social connection data included in the communications. Thus, in some instances, system 102 may receive communications in their entirety, rather than the social connection data determined from those communications.

In one embodiment, rather than capturing and processing communications at the device level (e.g., at the cellular telephone), system 102 may receive the communications and/or the social connection data from an intermediary node. For example, when an email communication is sent from the cellular telephone, the simple mail transfer protocol (SMTP) email server that receives the email communication may route or copy the communication to system 102. System 102 may then parse the communications for social connection data. For example, system 102 may evaluate the envelope, header, and/or body of an email communication for a sender email address, one or more recipient email addresses, and/or a device identification included in the email communication.

In one embodiment, system 102 may determine social connection data included in the communications. That is, system 102 may receive communications and determine social connection data included therein. Social connection data may describe a link between two or more communicating parties evidencing a relationship. A relationship may include, for example, friendship, familial, work, acquaintance, and so forth.

System 102 may group communications for the cellular telephone together using, for example, the IMEI of the cellular telephone, although other unique device identifiers may also likewise be utilized in accordance with the present disclosure. After the communications have been generally grouped together according to a common device identifier, system 102 may group communications together according to various communications types, such as email, telephonic, short message service, and so forth. For example, email communications associated with a particular device identifier may be grouped together by system 102. Each communication that has a particular communication type may be linked to other similar communications having the same communication type, via a common linkage, such as the device identifier.

Because the device identifier uniquely identifies the computing device that generates or facilitates communications, the communications may be directly associated with the communications device via the device identifier. Further, because an end user is frequently associated with the communications device, the end user may be associated with the device identifier, as has been described in greater detail above.

According to some embodiments, system 102 may create a communications type sub-graph from communications, which have been grouped together by a communication type. For example, system 102 may generate a communications type sub-graph for email communications. Example communications type sub-graphs are illustrated in FIGS. 3A, 3B, 5A, and 5B, which will be described in greater detail below.

Figure 4:
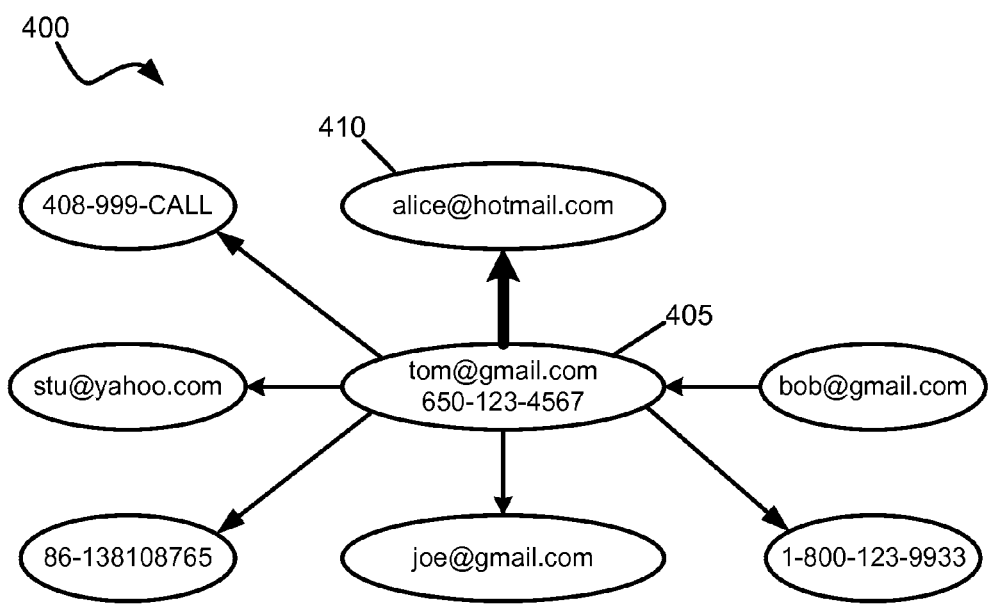
FIG. 4 illustrates an example communications-based connections graph created by merging the communication-type sub-graphs of FIGS. 3A and 3B.
Figure 6:
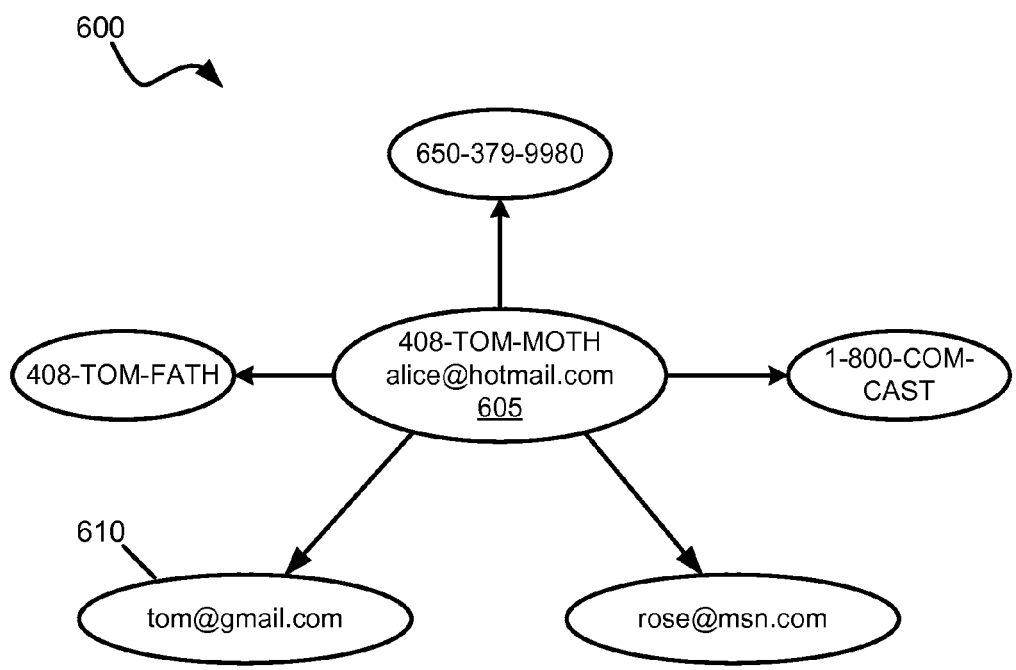
FIG. 6 illustrates an example communications-based connections graph created by merging the communication-type sub-graphs of FIGS. 5A and 5B.

Because each of the communications type sub-graphs has, as a common linkage, the device identifier, communications type sub-graphs may be merged into a communications-based connections graph. Example communications-based connections graphs are illustrated in FIGS. 4 and 6, which will be described in greater detail below.

Figure 7:
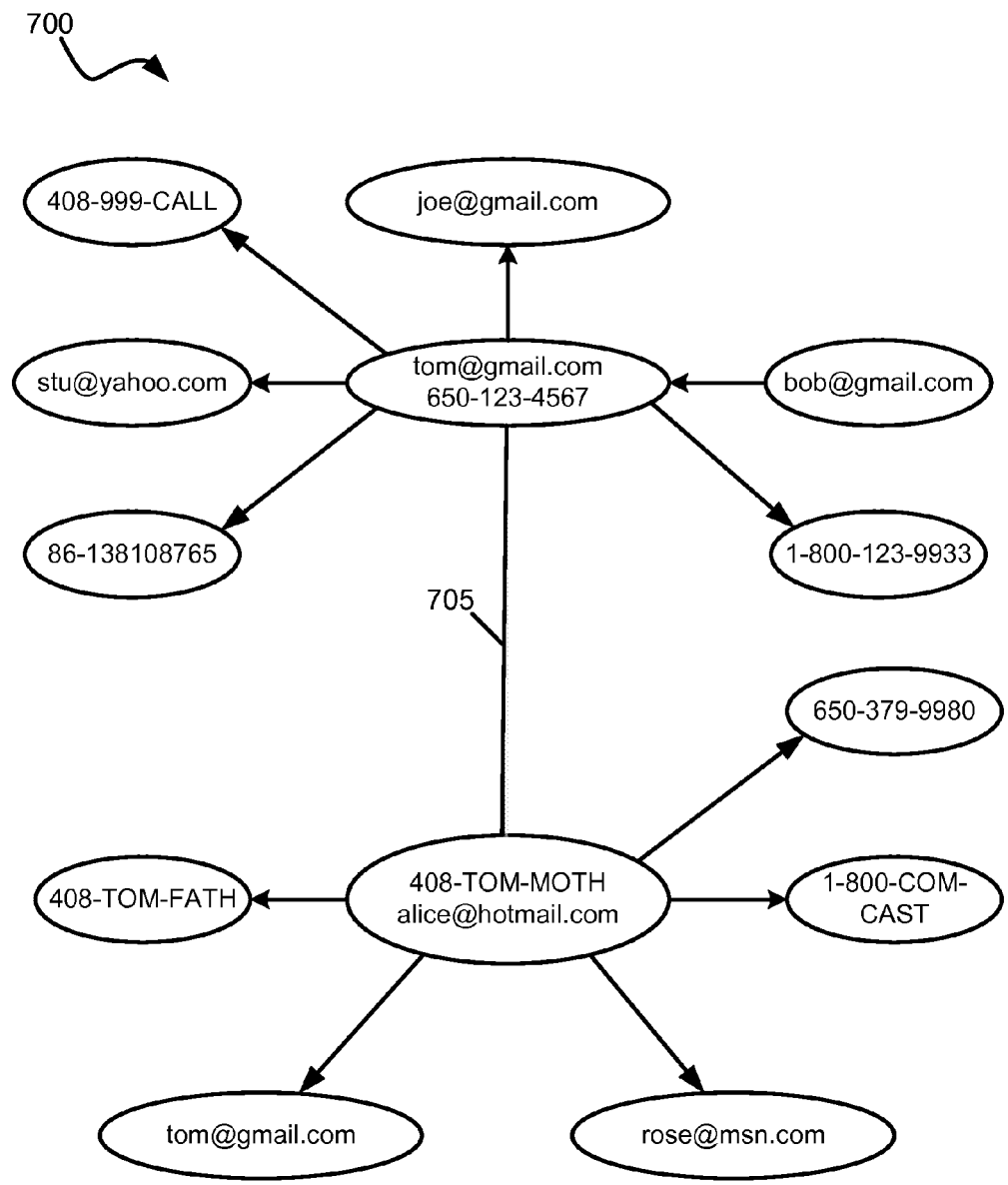
FIG. 7 illustrates an example aggregated social network graph created by merging the communications-based connections graphs of FIGS. 4 and 6, according to some embodiments.

In one embodiment, system 102 may merge two or more communications-based connections graphs for two different communicating parties to create an aggregated social network graph. An example aggregated social network graph is illustrated in FIG. 7, which will be described in greater detail below.

In addition to grouping communications together according to communication type and creating various social network graphs, system 102 may enhance these social network graphs using connection strength metrics. Generally, connection strength metrics attempt to quantify a strength of a relationship between two or more communicating parties by evaluating various factor such as communications frequency, content, sentiment, and so forth.

More specifically, but not by way of limitation, system 102 determines a connection strength between two or more communicating parties by evaluating, for example, a frequency of communications between two or more parties. Communicating parties that communicate frequently may be ascribed a connection strength that is relatively greater than a connection strength ascribed to communicating parties that communicate infrequently. In contrast, infrequent telephonic communications of short duration between two other communicating parties may be assigned a relatively lower connection strength.

In other embodiments, system 102 may determine a connection strength by evaluating, for example, metadata and content included in the communications. By way of non-limiting example, system 102 may evaluate the metadata and/or content of a communication by using keyword analysis. Word or phrase frequency may indicate the strength of the relationship between communicating parties. Thus, if system 102 detects the phrase, "I love you," in an email communication and/or determines that the communicating parties frequently exchange email communications, system 102 may assign a relatively higher connection strength to the linkage between the communicating parties.

Additionally, a sentiment for a communication may be determined by system 102 by evaluating keywords or phrases included in a communication. In one embodiment, system 102 may evaluate keywords included in the body of an email. Keywords that indicate affection, closeness, approval, and other such emotions or actions may be used by system 102 as an indication of a strong or positive relationship between parties. Conversely, words associated with negative emotions or actions may be used by system 102 as an indication of a weak or negative relationship between parties.

Depending on the communication type, different content evaluation methods may be utilized by system 102. For example, call data (e.g., audio portions of a telephonic communication) for a telephonic communication may be evaluated utilizing techniques such as diarization (speaker differentiation), speech recognition, and other audio evaluation techniques that would be known to one of ordinary skill in the art with the present disclosure before them.

Figure 3A:
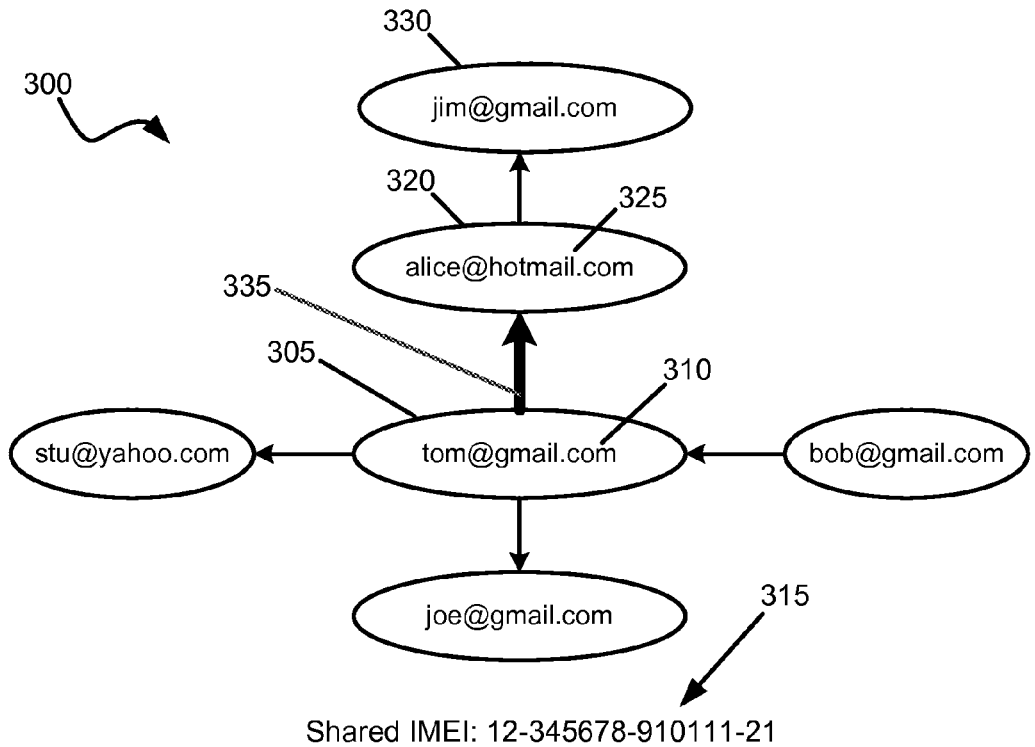
FIG. 3A illustrates an example communication-type sub-graph for a first communications device, created from social connection data obtained from email communications.
Figure 3B:
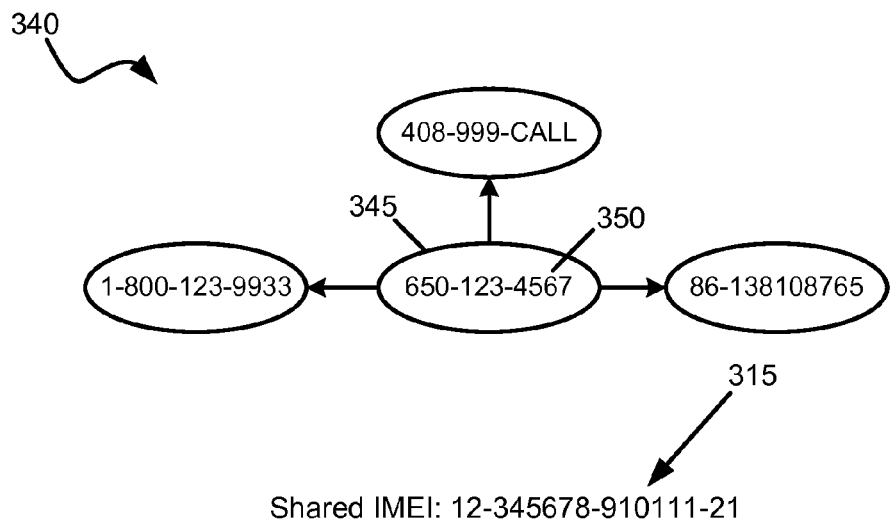
FIG. 3B illustrates another example communication-type sub-graph for the first communications device, created from social connection data obtained from telephonic communications.

FIGS. 3A and 3B illustrate two different connection type sub-graphs that are generated by system 102, according to some embodiments. With regard to FIG. 3A, a communications type sub-graph 300 for email communications is shown. Graph 300 may visually represent email communications processed by a communications device.

In one embodiment, graph 300 includes a hub node 305, which includes an identifier email address 310 for a first communicating party associated with the communications device, and a device identifier 315. For example, if communications type sub-graph 300 is a graph of email communications, identifier email address 310 may comprise an email address for the first communicating party, such as "tom@gmail.com." Additionally, device identifier 315 may include the IMEI of the communications device, for example, "12-345678-910111-21." It is noteworthy that the IMEI is shared between two communications type sub-graphs of FIGS. 3A and 3B.

Communications type sub-graph 300 also comprises a plurality of nodes, such as node 320. Each node comprises social connection data determined from a communication. For example, node 320 comprises a recipient identifier 325. Recipient identifier 325 may include an email address "alice@hotmail.com" associated with a second communicating party. Node 320 is connected to hub node 305 because of the social connection data included in the email communication. For example, an email message was detected that included social connection data such as "alice@hotmail.com" as a recipient address, "tom@ gmail.com" as the sender address, and a device identifier, which includes the IMEI.

Again, each node, such as node 320, which is connected to hub node 305, represents an instance of email communication. Graphically, an edge that connects hub node 305 with another node represents an instance of email communication. The edges between nodes may be directed and represented by an arrow. Thus, an arrow that emanates from hub node 305 to another node may represent an outgoing email. In contrast, an arrow that emanates from a node to hub node 305 may represent an incoming email.

In some instances, since emails can be forwarded or passed to other communicating parties, hub node 305 may be indirectly linked to additional indirect nodes such as node 330. For example, if a first communicating party sends an email to a second communicating party, who then forwards the same or similar email to a third communicating party, the social connection data gathered from the communications of the email chain may be used by system 102 to create linkages between the communicating parties. For example, communications in an email chain may be represented as hub node 305, node 320, and indirect node 330. The relative distance (e.g., number of intermediate nodes) between hub node 305 and indirect node 330 may represent a connection strength between the communicating party associated with indirect node 330 and hub node 305 associated with the first communicating party.

As mentioned above, linkages between communicating parties (as shown by linking of nodes to the hub node) may have differing degrees of strength. For example, two communicating parties that frequently call one another may evidence a strong social connection from an evaluation of call frequency. The strength of connection between communicating parties may be represented graphically by varying the appearance of the visual linkage (e.g., edge) between hub node 305 and a connected node. For example, a link between hub node 305 and node 320 may comprise an arrow 335 that is thicker in size relative to other nodes of graph 300. In some embodiments, graph 300 may be displayed as a graphical user interface where linkages may be represented as arrows or other linkages that extend between nodes. Thus, an end user viewing the graphical user interface may be able to differentiate between connection strengths based upon the relative thickness of the linkages between nodes. For example, the thickness of arrow 335 indicates that the end user identified in node 320 and the end user identified in hub node 305 have a strong communications-based social connection.

FIG. 3B is a communications type sub-graph 340 for telephonic communications. Communications type sub-graph 340 is generated similarly to communications type sub-graph 300 of FIG. 3A with the exception that communications type sub-graph 340 includes nodes that include social connection data obtained from telephonic communications. More specifically, a hub node 345 includes an identifier telephone number 350 for the communications device. Hub node 345 is connected to a plurality of nodes that represent, for example, phone calls.

FIG. 4 is a communications-based connections graph 400 that has been created by merging two or more communications type sub-graphs together, according to some embodiments. For example, communications type sub-graphs 300 and 340 of FIGS. 3A and 3B, respectively, may be merged together to create communications-based connections graph 400. Thus, communications-based connections graph 400 includes a plurality of nodes that may comprise nodes having different connection types relative to one another. Again, these nodes represent communications of varying type; and they may be directly linked to a hub node 405 because their device identifiers 315 match. Hub node 405 may include identifiers for communicating party associated with device identifier 315 for communications-based connections graph 400. In this example, hub node 405 may include two identifiers 310 and 350, which represent the identifiers of hub nodes 305 and 345 of communications type sub-graphs 300 and 340, respectively. Stated otherwise, hub node 405 of communications-based connections graph 400 is a concatenation of each of hub nodes 305 and 345 of communications type sub-graphs 300 and 340, respectively.

In one embodiment, communications-based connections graph 400 may include nodes for email communications and nodes for telephonic communications, which are all connected to hub node 405. Communications-based connections graph 400 may also include a shared node 410, which includes social connection data that is shared in common with another node of an additional communications-based connections graph, which will be described in greater detail below with reference to FIG. 6.

Communications-based connections graph 400 may represent a "communications-based" social network generated by system 102. This social network is generated by evaluating the actual communications conducted by the communicating party associated with device identifier 315. This social network is graphically represented by communications-based connections graph 400.

Figure 5A:
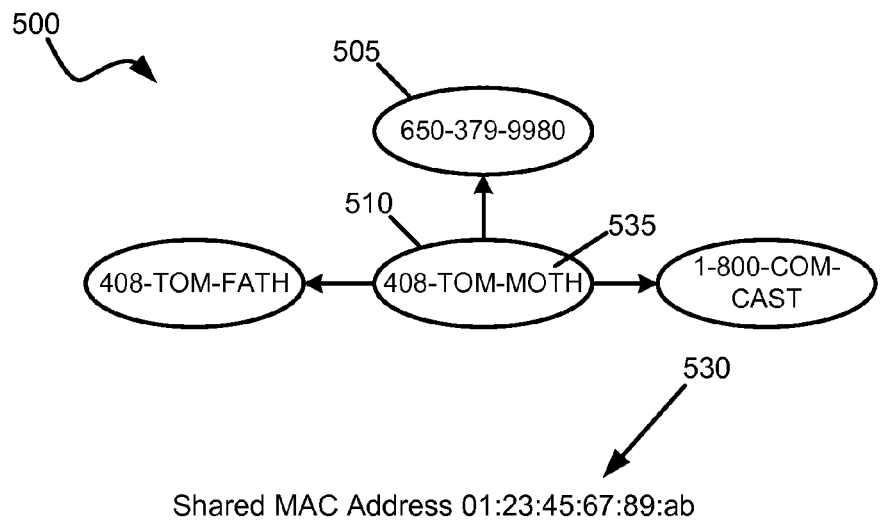
FIG. 5A illustrates an example communication-type sub-graph for a second communications device, created from social connection data obtained from telephonic communications.
Figure 5B:
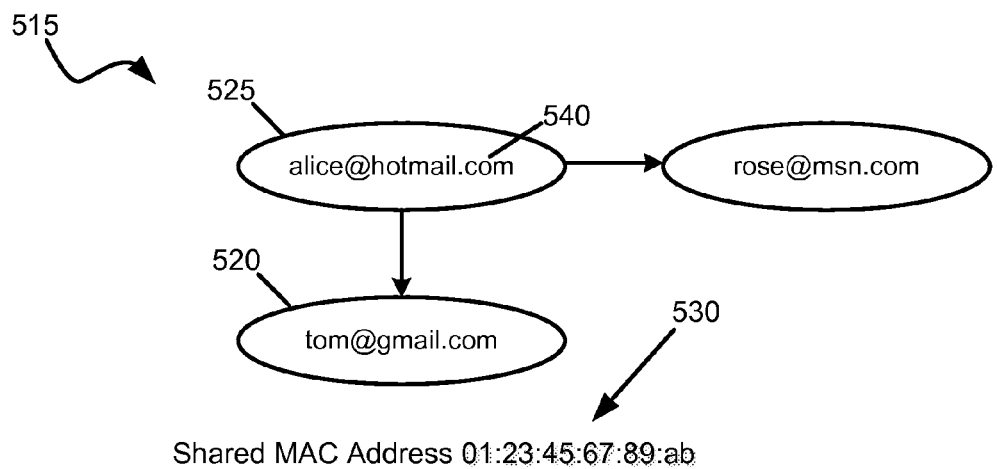
FIG. 5B illustrates another example communication-type sub-graph for the second communications device, created from social connection data obtained from email communications.

FIG. 5A comprises a communications type sub-graph 500 for a second communicating party, according to some embodiments. Communications type sub-graph 500 includes nodes for telephonic communication, such as a node 505. The nodes are linked to a hub node 510, which includes an identifier telephone number 535, such as a telephone number "408-TOM-MOTH" that includes an at least partial alphabetic representation of digits included in the telephone number. FIG. 5B comprises a communications type sub-graph 515 for the second communicating party. Communications type sub-graph 515 includes nodes for email communication, such as a node 520. The nodes are linked to a hub node 525, which includes an email address identifier 540, such as an email address "alice@hotmail.com." The nodes may be linked to hub node 525 by a device identifier 530, such as an example MAC address "01:23:45:67:89:ab" that identifies, for example, a tablet device.

FIG. 6 is a communications-based connections graph 600 that has been created by merging two or more communications type sub-graphs together, according to some embodiments. For example, communications type sub-graphs 500 and 515 of FIGS. 5A and 5B, respectively, may be merged together to create a communications-based connections graph 600. Similarly to communications-based connections graph 400 of FIG. 4, communications-based connections graph 600 may comprise a hub node 605, which may include identifiers 535 and 540 for the communicating party associated with device identifier 530 for communications-based connections graph 600. Thus, hub node 605 may include two identifiers 535 and 540, which include the identifiers of hub nodes 510 and 525 of communications type sub-graphs 500 and 515, respectively.

According to some embodiments, system 102 may generate an aggregated social network from combining two or more communications-based connections graphs associated with two or more communicating parties. In one embodiment, system 102 may locate one or more nodes in the two or more communications-based connections graphs that each comprises the same social connection data. For example, two different communications-based connections graphs may each comprise a node that includes the same identifier, such as an email address. These two communications-based connections graphs may be linked together via these nodes that include shared connection data.

In an example, an email communication sent from a first communications device to a second communications device may be used in the creation of communications-based social networks for the first communications device. Because, a second communications device also receives the email communication, the email communication may also be used in the creation of communications-based social networks for the second communications device. Thus, the social connection data obtained from the email communication, which is included in both of the communications-based social networks, could be used as a connection point (e.g., shared nodes) for joining the two communications-based social networks together to create an aggregated social network.

By way of non-limiting example, communications-based connections graph 600 may comprise a shared node 610. Again, system 102 may determine "shared" nodes by evaluating nodes of a plurality of communications-based connections graphs to determine nodes that have the same social connection data included therein. In some instances, a "shared" node contains at least a portion of the social connection data included in a node from a communications-based connections graph of another communicating party. Shared node 610 of FIG. 6 comprises an identifier (e.g., email address "tom@ gmail.com"), which is shared in common with hub node 405 of communications-based connections graph 400 of FIG. 4. The email address "alice@hotmail.com" included in shared node 410 of FIG. 4 is also included in hub node 605 of FIG. 6. Similarly, the email address "tom@ gmail.com" is included in a shared node 610 of FIG. 6. This cross-correlation of email addresses between one or more nodes of communications-based connections graphs is indicative of a communications-based social connection.

In this example, the identifier of shared node 610 of communications-based connections graph 600 is determined by system 102 to be substantially similar to the identifier of shared node 410 of FIG. 4. Thus, nodes of different communications-based connections graphs that are substantially similar may be referred to as "shared" nodes.

FIG. 7 illustrates an example aggregated social network graph created by merging the communications-based connections graphs of FIGS. 4 and 6, according to some embodiments. As shown in FIG. 7, system 102 may merge communications-based connections graphs of FIGS. 4 and 6 together to form an aggregated social network graph 700. It is noteworthy that because the email addresses included in shared nodes 410 and 610 of FIGS. 4 and 6, respectively, are identifiers that were merged into the hub nodes of the communications-based connections graphs, shared nodes 410 and 610 essentially disappear and are replaced by a linkage 705.

While this example contemplates joining the communications-based connections graphs of two communicating parties, one of ordinary skill in the art will appreciate that aggregated social network graphs may likewise be created for any number of communicating parties.

Additionally, while communications-based social networks may be represented by the various graphs contemplated above, one of ordinary skill in the art will appreciate that other graphical representations of communications-based social networks may likewise be utilized in accordance with the present disclosure. Additionally, in one embodiment, a communications-based social network may be arranged into a table or other data store, such as a user record. The user record may be stored in the social network database 106 (see FIG. 1). These communications-based social networks may be used by a social network platform to provide the end user with possible connections for other existing or proprietary social networks. Thus, if the communications-based social networks indicate a relationship between communicating parties which are not currently included in a social network for an end user, the social network platform may provide the end user suggestive connections in accordance with the communications-based social networks generated for the end user.

In various embodiments, system 102 enables users of the social network system to specify and/or consent to the use of personal information, which may include system 102 using email addresses, telephone numbers, names, and device identifiers such as IMEI, SIM card data, IP addresses, MAC addresses, and so forth. For example, the social connection data obtained by system 102 from an email communication may comprise a sender email address, a recipient email address, and a device identifier (e.g., the device that processed the email communication). Other data included in the email communication may also likewise be subject to various types of analyses by system 102, such as translation and keyword analysis. Thus, system 102 may also evaluate the content and metadata of the email communication, as well as other data included in the envelope, header, or body of the email communication. System 102 may also subject various other types of communications described herein to varying levels of inspection, such as shallow and deep packet inspection. Embodiments provide other ways of enabling users of the social network system to specify and/or consent to the use of personal information. For example, at the device/client side, a user may have control over his or her personal data, such as disabling social network detection at all, only allowing some types of communication, only allowing shallow inspection on the communication, etc. Some embodiments may enable a user to have an option of clearing his or her entire detected network.

Figure 8:
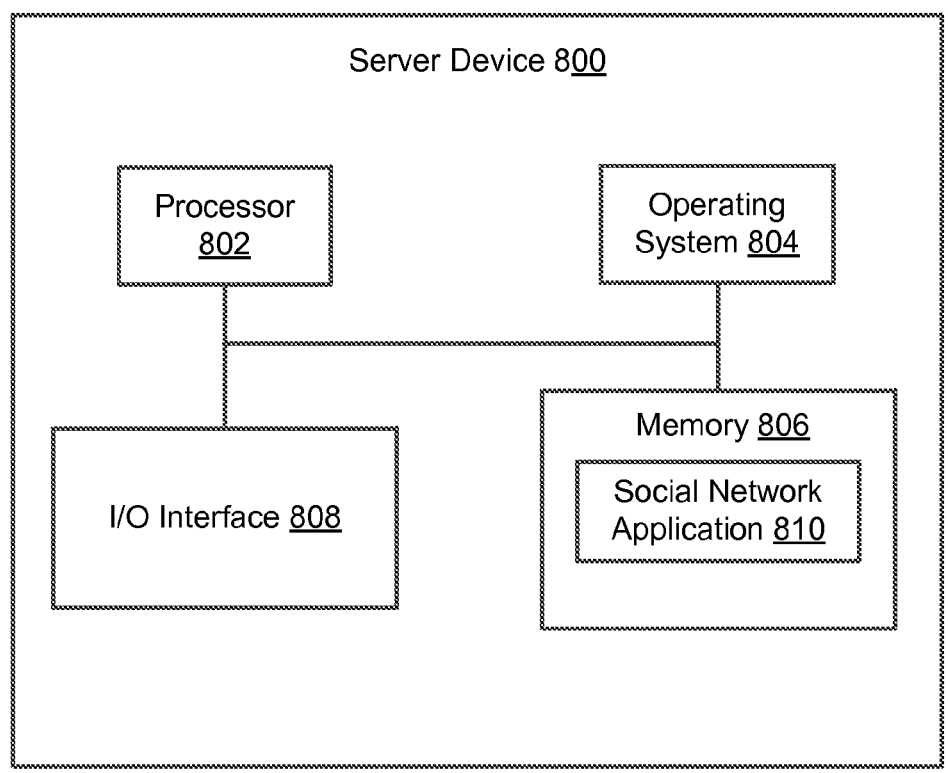
FIG. 8 illustrates a block diagram of an example server device, which may be used to implement the embodiments described herein.

FIG. 8 illustrates a block diagram of an example server device 800, which may be used to implement the embodiments described herein. For example, server device 800 may be used to implement server device 104 of FIG. 1, as well as to perform the method embodiments described herein. In one embodiment, server device 800 includes a processor 802, an operating system 804, a memory 806, and an input/output (I/O) interface 808. Server device 800 also includes a social network application 810, which may be stored in memory 806 or on any other suitable storage location or computer-readable medium. Social network application 810 provides instructions that enable processor 802 to perform the functions described herein and other functions.

For ease of illustration, FIG. 8 shows one block for each of processor 802, operating system 804, memory 806, I/O interface 808, and social network application 810. These blocks 802, 804, 806, 808, and 810 may represent multiple processors, operating systems, memories, I/O interfaces, social network engines, and media applications. In other embodiments, server device 800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A method comprising:
   determining social connection data included in communications, the social connection data including identifiers for each communicating party of a plurality of communicating parties and a device identifier associated with an end user, the end user being one of the communicating parties;
   grouping the communications together based upon the device identifier;
   based on the grouping, generating a first communications-based social network for the end user from the determined social connection data;
   generating a second communications-based social network for a second user;
   identifying a first hub node in the first communications-based social network that includes first social connection data and a second node in the second communications-based social network that includes the first social connection data, wherein the second node is linked to a second hub node of the second communications-based social network;
   generating an aggregated social network by merging the first communications-based social network and the second communications-based social network, wherein the aggregated social network includes a linkage between the first hub node in the first communications-based social network and the second hub node in the second communications-based social network, wherein the aggregated social network excludes the second node of the second communications-based social network;
   determining a connection strength of the linkage based upon metadata and content included in the communications between a first communicating party represented by the first hub node and a second communicating party represented by the second hub node; and
   providing the end user with a suggested connection for a second social network based on the aggregated social network.

2. A method comprising:
   determining social connection data included in communications, wherein a first portion of the social connection data is associated with a first communication type and a first identifier, and wherein a second portion of the social connection data is associated with a second communication type and a second identifier, the communications being associated together via a device identifier;
   grouping the communications for an end user based on the first communication type and the second communication type;
   generating a first sub-graph for the communications that are associated with the first communication type and a second sub-graph for the communications that are associated with the second communication type;
   generating a communications-based social network for the end user by merging the first sub-graph and the second sub-graph, wherein the communications-based social network includes a hub node that includes the communications associated with the first identifier and the communications associated with the second identifier;
   determining a connection strength between two or more communicating parties in the communications-based social network based upon metadata and content included in the communications; and
   providing the end user with a suggested connection for a second social network based on an aggregated social network comprising the communications-based social network.

3. The method of claim 2, further comprising evaluating the communications to determine connection types between communicating parties, wherein at least a first connection type is associated with email communications, and wherein at least a second connection type is associated with telephone communications.

4. The method of claim 2, wherein the connection strength is a first connection strength and further comprising
   determining a second connection strength; and
   generating a user interface that includes a visual representation of the communications-based social network where the first connection strength and the second connection strength are illustrated with lines between nodes that each represent one of the communicating parties, wherein the first connection strength is illustrated with a line with a first thickness and the second connection strength is illustrated with a line with a second thickness less than the first thickness, wherein greater thickness indicates a stronger connection and wherein the nodes include the hub node.

5. The method of claim 2, wherein the connection strength is further based upon communication frequency between the two or more communicating parties.

6. The method of claim 2, wherein determining the connection strength includes performing keyword analysis to determine the connection strength based on types of words being used.

7. The method of claim 2, wherein the communications associated with the first communication type are determined based on a first program running on a client device and wherein the communications associated with the second communication type are determined based on a second program running on the client device.

8. The method of claim 2, further comprising:
   generating a user interface that includes suggestive connections based on the communications-based social network.

9. The method of claim 2, further comprising generating an aggregated social network by linking communications-based connection graphs for two or more end users together based upon sharing of one or more nodes between two or more communications-based connections graphs, wherein each node includes social connection data for one or more of the communications.

10. The method of claim 2, wherein the social connection data comprises one or more of identifiers for each communicating party and content of the communications.

11. The method of claim 2, wherein the device identifier comprises one or more of an international mobile equipment identity, an Internet protocol address, a media access control address, a personal identification number, a serial number, an international mobile subscriber identity, a mobile equipment identifier, and an integrated circuit card ID.

12. The method of claim 2, wherein the communications comprise any of telephonic communications, email communications, short message service messages, and any combinations thereof.

13. A system comprising:
one or more processors; and
logic encoded in one or more tangible media for execution by the one or more processors and when executed operable to perform operations comprising:
determining social connection data included in communications, wherein a first portion of the social connection data is associated with a first communication type and a first identifier, and wherein a second portion of the social connection data is associated with a second communication type and a second identifier, the communications being associated together via a device identifier;
grouping the communications for an end user based on the first communication type and the second communication type;
generating a first sub-graph for the communications that are associated with the first communication type and a second sub-graph for the communications that are associated with the second communication type;
generating a communications-based social network for the end user by merging the first sub-graph and the second sub-graph, wherein the communications-based social network includes a hub node that includes the communications associated with the first identifier and the communications associated with the second identifier;
determining a connection strength between two or more communicating parties in the communications-based social network based upon metadata and content included in the communications; and
providing the end user with a suggested connection for a second social network based on an aggregated social network comprising the communications-based social network.

14. The system of claim 13, wherein the connection strength is a first connection strength and wherein the logic when executed is further operable to perform operations comprising:
determining a second connection strength; and
generating a user interface that includes a visual representation of the communications-based social network where the first connection strength and the second connection strength are illustrated with lines between nodes that each represent one of the communicating parties, wherein the first connection strength is illustrated with a line with a first thickness and the second connection strength is illustrated with a line with a second thickness less than the first thickness, wherein greater thickness indicates a stronger connection and wherein the nodes include the hub node.

15. The system of claim 13, wherein the logic when executed is further operable to perform operations comprising:
generating a user interface for the end user that includes suggestive connections based on the communications-based social network.

16. The system of claim 13, wherein the logic when executed is further operable to perform operations comprising generating an aggregated social network by linking communications-based connection graphs for two or more end users together based upon sharing of one or more nodes between two or more communications-based connections graphs to generate an aggregated social network, wherein each node includes social connection data for one or more of the communications.

17. The system of claim 13, wherein the social connection data comprises one or more of identifiers for each communicating party and content of the communications.

18. The system of claim 13, wherein the device identifier comprises one or more of an international mobile equipment identity, an Internet protocol address, a media access control address, a personal identification number, a serial number, an international mobile subscriber identity, a mobile equipment identifier, and an integrated circuit card ID.

* * * * *